(No Model.)

S. ELLIOTT.
PNEUMATIC TIRE.

No. 487,874.  Patented Dec. 13, 1892.

WITNESSES
William C Jennings
Lucy F. Graves.

INVENTOR
Sterling Elliott
by B.J. Noyes.
ATTY

UNITED STATES PATENT OFFICE.

STERLING ELLIOTT, OF NEWTON, ASSIGNOR TO THE ELLIOTT HICKORY CYCLE COMPANY, OF WATERTOWN, MASSACHUSETTS.

PNEUMATIC TIRE.

SPECIFICATION forming part of Letters Patent No. 487,874, dated December 13, 1892.

Application filed March 22, 1892. Serial No. 425,921. (No model.)

*To all whom it may concern:*

Be it known that I, STERLING ELLIOTT, of Newton, county of Middlesex, State of Massachusetts, have invented an Improvement in Pneumatic Tires, of which the following description, in connection with the accompanying drawings, is a specification, like letters on the drawings representing like parts.

The pneumatic tire of velocipede-wheels as now commonly made frequently collapses, owing to a break occurring at some part thereof, and when in such collapsed condition it overlaps the edges of the felly, which may have a tendency to cut or injure the same as the wheel revolves. This trouble is more apparent when the tire collapses while the machine is in motion, as at such time the wheel has an opportunity to revolve many times before it can be brought to rest.

This invention has for its object to provide a pneumatic tire with suitable means whereby the collapsed tire will be contracted or drawn into the recess in the felly, so that it cannot overlie the edges thereof and become cut or injured in any way even though the wheel should revolve.

As a simple way of carrying out my invention I have arranged on the outside of the expansible air-tube of said pneumatic tire, or it may be upon some other part of said pneumatic tire, a ring or band—as of rubber, for instance—or some other suitable form of strip having sufficient contractility to contract or draw the outer portion of said tube and preferably the other parts of the pneumatic tire connected therewith into the semicircular or other shaped recess in the felly, but which may be expanded as the air-tube is filled. The contractible strip when made as a band or ring may be made of any suitable width and thickness, and, while preferably made to encircle the air-tube, it may be made to encircle some other component part of said pneumatic tire.

Figure 1:
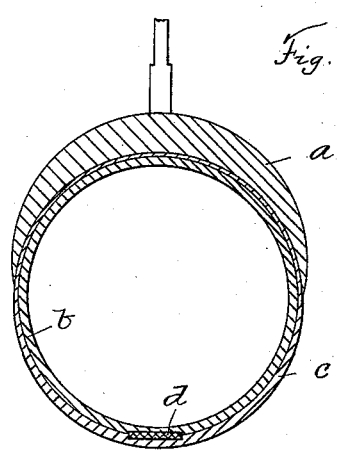
Figure 2:
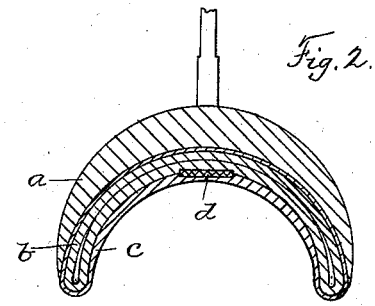
Figure 3:
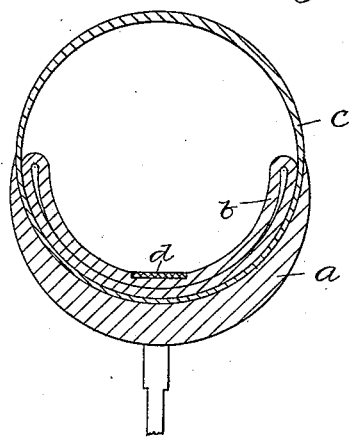

Figure 1 shows in cross-section one form of pneumatic tire provided with a contractible strip embodying this invention; Fig. 2, a similar view showing the contractible strip in its contracted condition, the air-tube having collapsed; Fig. 3, a similar view showing the contractible strip as connected only to the air-tube, and Fig. 4 a modification to be referred to.

The felly $a$, herein represented as made crescent-shaped, thereby having an exterior semicircular recess, the expansible air-tube $b$, and covering or tread-face $c$ are all of any well-known or suitable construction.

A contractible strip is provided for the air-tube, which, as represented in Figs. 1 and 3, consists of a contracting ring or band $d$ of rubber or the like, made independent of but adapted to encircle the air-tube $b$, it being made quite narrow and also quite thin; but said ring or band may be made of any other suitable width or thickness. The contractible ring or band $d$ will expand with the air-tube as the latter is filled; but if said air-tube should collapse the said band or ring, being unrestrained, will contract and draw the outer portion of said air-tube and the parts connected therewith into the semicircular or other shaped recess in the felly, as represented in Fig. 2, so that when so withdrawn no part of said pneumatic tire can overlap the edges of the felly and become cut or injured. The contractible ring or band $d$ may be cemented to said air-tube $b$, if desired, and if the pneumatic tube is made up of several different parts the said ring or band may be connected with or interposed between any of the component parts.

By referring to Fig. 3 it will be seen that the contracting ring or band is connected only with the air-tube, so that when it contracts it draws in the air-tube; but the remaining parts of the tire are left, but it will be understood that even should the outer or tread face become cut or slightly injured it will not be rendered useless.

Figure 4:
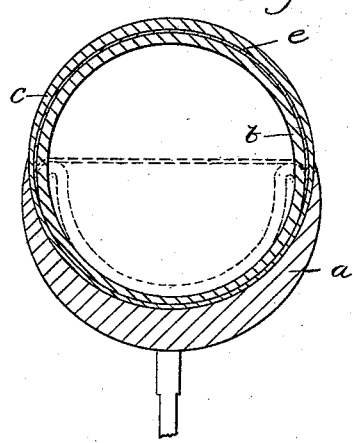

By referring to Fig. 4 the contractible strip is represented as a band of rubber $e$ or other material possessing sufficient contractility inclosing a portion of the air-tube and connected thereto at each side, so that when it contracts it will force the outer portion of said air-tube inward, as shown, or otherwise.

In using this form of contracting device I would employ quite a number of these transversely-arranged strips at different parts of the air-tube, and when said tube collapses they would naturally contract in unison. Therefore I desire it to be understood that I do not intend to limit my invention to any particular form or construction of contractible strip nor to the number employed, so long as they are made independent of the air-tube, but adapted to draw the same into the recess of the felly when said air-tube collapses.

I claim—

A wheel having a recessed felly and a pneumatic tire supported thereon, combined with one or more independent contractible strips for drawing the air-tube of said tire into the recess of the felly as said tube collapses, substantially as described.

In testimony whereof I have signed my name to this specification in the presence of two subscribing witnesses.

STERLING ELLIOTT.

Witnesses:
BERNICE J. NOYES,
LUCY F. GRAVES.